US010558798B2

(12) United States Patent
Weinstein et al.

(10) Patent No.: US 10,558,798 B2
(45) Date of Patent: Feb. 11, 2020

(54) SANDBOX BASED INTERNET ISOLATION IN A TRUSTED NETWORK

(71) Applicant: L3 Technologies, Inc., New York, NY (US)

(72) Inventors: Jay Weinstein, Churchville, PA (US); Mark Fenkner, Marlton, NJ (US); Charles King, Plano, TX (US); Ismael Lopez, Bronx, NY (US); Peter Martz, Blenheim, NJ (US)

(73) Assignee: L3Harris Technologies, Inc., Melbourne, FL (US)

( * ) Notice: Subject to any disclaimer, the term of this patent is extended or adjusted under 35 U.S.C. 154(b) by 274 days.

(21) Appl. No.: 15/637,878

(22) Filed: Jun. 29, 2017

(65) Prior Publication Data
US 2019/0005227 A1   Jan. 3, 2019

(51) Int. Cl.
*H04L 29/06* (2006.01)
*G06F 21/53* (2013.01)
(Continued)

(52) U.S. Cl.
CPC ............ *G06F 21/53* (2013.01); *H04L 9/3234* (2013.01); *H04L 61/2007* (2013.01);
(Continued)

(58) Field of Classification Search
CPC .......... G06F 21/53; G06F 21/566; G06F 9/46; H04L 63/083; H04L 63/0281;
(Continued)

(56) References Cited

U.S. PATENT DOCUMENTS 7,478,330 B1   1/2009 Branson et al.
7,698,442 B1   4/2010 Krishnamurthy et al.
(Continued)

FOREIGN PATENT DOCUMENTS

RU   2406138 C1   12/2010

OTHER PUBLICATIONS

Burnett, Mark, "How I Secured One Company's Network", Using Log Parser, Virtualization, and a Little Psychology, Sep. 17, 2006, 4 pages.
(Continued)

*Primary Examiner* — Longbit Chai
(74) *Attorney, Agent, or Firm* — Condo Roccia Koptiw LLP

(57) ABSTRACT

Methods and systems are disclosed for sandbox based internet isolation system in a trusted network. A networked computer system may include a trusted local area network (LAN) and at least one host computer system connected to the trusted LAN. The host computer system may include a host-based firewall, an operating system, a first memory space, and a second memory space. The host-based firewall may be configured to prevent unauthorized communication between the host computer system and one or more other devices on the trusted LAN. The second memory space may be configured to enable storage and/or operation of one or more applications and/or processes associated with a sandboxed computing environment. The host computer system may include a sandbox firewall that enforces a separation of the first and second memory spaces.

20 Claims, 4 Drawing Sheets

(51) Int. Cl.
*H04L 9/32* (2006.01)
*H04L 29/12* (2006.01)

(52) U.S. Cl.
CPC .............. *H04L 63/08* (2013.01); *H04L 63/10* (2013.01); *H04L 67/42* (2013.01)

(58) Field of Classification Search
CPC ..... H04L 61/2007; H04L 67/42; H04L 63/08; H04L 9/3234; H04L 63/10; H04L 63/0428; H04L 63/168
USPC .......................................................... 726/26
See application file for complete search history.

(56) References Cited

U.S. PATENT DOCUMENTS

| | | | |
|---|---|---|---|
| 7,805,516 | B2 | 9/2010 | Kettler et al. |
| 8,479,279 | B2 | 7/2013 | Li et al. |
| 9,942,198 | B2 | 4/2018 | Hoy et al. |
| 2002/0069369 | A1 | 6/2002 | Tremain et al. |
| 2006/0070066 | A1 | 3/2006 | Grobman |
| 2007/0220187 | A1 | 9/2007 | Kates |
| 2007/0260873 | A1 | 11/2007 | Hatfalvi et al. |
| 2008/0028401 | A1 | 1/2008 | Geisinger |
| 2008/0201711 | A1 | 8/2008 | Amir Husain |
| 2008/0256536 | A1 | 10/2008 | Zhao et al. |
| 2009/0172781 | A1 | 7/2009 | Masuoka et al. |
| 2009/0328038 | A1 | 12/2009 | Yamada et al. |
| 2010/0138829 | A1 | 6/2010 | Hanquez et al. |
| 2010/0138830 | A1 | 6/2010 | Astete et al. |
| 2010/0223613 | A1 | 9/2010 | Schneider |
| 2010/0251329 | A1 | 9/2010 | Wei |
| 2012/0023593 | A1 | 1/2012 | Puder et al. |
| 2012/0054853 | A1* | 3/2012 | Gupta ..................... G06F 21/53 726/17 |
| 2013/0318594 | A1* | 11/2013 | Hoy ........................ G06F 21/53 726/17 |
| 2015/0134956 | A1* | 5/2015 | Stachura ............. H04L 63/0807 713/168 |
| 2017/0019422 | A1* | 1/2017 | Makowski .......... H04L 63/1433 |
| 2018/0270200 | A1* | 9/2018 | Byrne ..................... G06F 21/53 726/17 |
| 2019/0058597 | A1 | 2/2019 | Lim et al. |

OTHER PUBLICATIONS

Laverick, Mike, "Hypervisor Management and Optimization for Advanced Virtualization", E-book, TechTarget, 2010.
Li et al., "VSITE: A Scalable and Secure Architecture for Seamless L2 Enterprise Extension in the Cloud", 6th IEEE Workshop on Secure Network Protocols (NPSec), Oct. 2010.
Reuben, Jenni Susan, "A Survey on Virtual Machine Security", TKK T-110.5290 Seminar on Network Security, Oct. 11-12, 2007, 5 pages.
Villeneuve, Nart, "Command and Control in the Cloud", Malware Explorer, Oct. 22, 2010.
Wikipedia, "Computer Networking", Available at https://en.wikipedia.org/wiki/Computer_network, Dec. 2010, 19 pages.
Wikipedia, "Computer Security", Available at https://en.wikipedia.org/wiki/Computer_security, retrieved on Dec. 2010, 27 pages.
Wikipedia, "Cyber Security Standards", Available at https://en.wikipedia.org/wiki/Cyber_security_standards, retrieved on Dec. 2010, 9 pages.
Wikipedia, "HTTP Secure", Available at https://en.wikipedia.org/wiki/HTTPS, retrieved on Dec. 2010, 9 pages.
Wikipedia, "Hypervisor", Available at <https://en.wikipedia.org/wiki/Hypervisor> , retrieved on Dec. 2010, 6 pages.
Wikipedia, "Internet Protocol", Available at https://en.wikipedia.org/wiki/Internet_Protocol, retrieved on Dec. 2010, 5 pages.
Wikipedia, "Multiprotocol Label Switching", Available at <https://en.wikipedia.org/wiki/Multiprotocol_Label_Switching> , retrieved on Dec. 2010, 8 pages.
Wikipedia, "Network Address Translation", Available at https://en.wikipedia.org/wiki/Network_address_translation, Dec. 2010, 12 pages.
Wikipedia, "Security-Focused Operating System", Available at https://en.wikipedia.org/wiki/Security-focused_operating_system, retrieved on Dec. 2010, 9 pages.
Wikipedia, "Virtual Desktop", Available at https://en.wikipedia.org/wiki/Virtual_desktop, retrieved on Dec. 2010, 5 pages.
Wikipedia, "Virtual Private Network", Available at https://en.wikipedia.org/wiki/Virtual_private_network, retrieved on Dec. 2010.
Barnet, Mark, "Praktikum Po Zaschite Seti Kompanii", Windows IT Pro/RE, Nov.-Dec. 2006, pp. 78-81.

* cited by examiner

SANDBOX BASED INTERNET ISOLATION IN A TRUSTED NETWORK

CROSS-REFERENCE TO RELATED APPLICATIONS

This application incorporates by reference the subject matter of U.S. patent application Ser. No. 15/637,951, entitled SANDBOX BASED INTERNET ISOLATION IN AN UNTRUSTED NETWORK, filed contemporaneously herewith on Jun. 29, 2017.

BACKGROUND

The Internet provides access to a large number of systems from which beneficial and/or harmful data may be retrieved by a host computer system attached to and communicating over the Internet. Harmful data that can be accessed through the Internet includes a variety of viral software constructs, generally referred to as malicious software or malware. Malware may be downloaded to a host computer system unintentionally, for example, by and/or without the knowledge of the user of the host computer system.

A host computer system that has downloaded malware may be referred to as an infected host computer system. An infected host computer system may result in possible security losses, reduction of efficiency, and/or malfunctions. Security losses may include, but are not limited to, the loss of some or all data that is accessible by the infected host computer system, the installation of additional malware onto the infected host computer system, and/or the loss of command and control of the infected host computer system. Reduction of efficiency may be incurred from, but not limited to, additional processor demand, additional memory usage, and/or additional network access by the executing malware The security and privacy of the user of the infected host computer system user may be compromised by malware. Both information located on the infected host computer system and/or information stored on or communicated via a local area network may be susceptible to attack by the malware. In many instances, an infected host computer may be used by the malware as a vehicle to stage an attack on other network resources that are accessible from the infected host computer system. Such an attack method is often undetected by the user of the host computer system and/or network administrators.

An infected host computer system may lose command and control. The loss of command and control of the infected host computer system may include performing one or more actions the author of the downloaded malware may desire. For example, the malware may perform a reconnaissance of the infected host computer system, determine system privileges, access local files, access security tokens, and/or attempt infection or access of other network resources accessible from the infected computer system

SUMMARY OF THE INVENTION

Methods and systems are disclosed for a sandbox based Internet isolation in a trusted network. A networked computer system may include a trusted local area network (LAN) and at least one host computer system. The at least one home computer system may be configured to connect to the trusted LAN. The host computer system may include a first firewall, an operating system, a first memory space, and a second memory space. The first firewall may be configured to prevent unauthorized communication between the host computer system and one or more network resources on the trusted LAN, the networked computer system, and/or the Internet.

The first memory space may be configured to enable storage and/or operation of a workspace configured to execute a first set of one or more applications and/or processes running on an operating system of the host computer system. The workspace may be configured to enable user interaction with the applications and processes running on the operating system. The second memory space may be configured to enable storage and/or operation of a second set of one or more applications and/or processes associated with a sandboxed computing environment configured to run on the operating system. The second set of one or more applications and/or processes may include a browser process that may be configured to operate within the sandboxed computing environment. The sandboxed computing environment may be enforced via a sandbox container process that segregates the workspace associated with the first memory space from the sandboxed computing environment associated with the second memory space. The sandbox container process may be configured to prevent data from being communicated between the sandboxed computing environment and the workspace without an explicit user input.

The sandboxed computing environment may be configured to classify a network destination as trusted or untrusted, for example based on one or more of a whitelist or a blacklist. The whitelist may include a list of trusted network destinations. The blacklist may include a list of untrusted network destinations. The sandbox container process may permit access to trusted network destinations via one or more of the first set of one or more applications and/or processes associated with the workspace. The sandbox container process may permit access to the untrusted network destinations via one or more of the second set of one or more applications and/or processes associated with the sandboxed computing environment. An example of an untrusted network destination may be an Internet resource and the Internet resource may be accessed via the browser process configured to operate within the sandboxed computing environment. One or more processes associated with the browser program may be configured to run within the sandbox portion of memory space. The sandbox browser may receive malware from the Internet. The second memory space may be isolated from the first memory space. The sandbox container process may be configured to prevent the malware from executing on the operating system and/or accessing processes and/or data on the operating system. The host computer system may be configured to consider the sandbox browser as infected and/or untrusted, for example, assuming that sandbox browser has received the malware from the Internet.

The first firewall may be configured to operate between the workspace of the first memory space and the trusted LAN. The first firewall may be configured to prevent unauthorized communication between the first set of one or more applications and/or processes executing in the workspace and one or more other devices on the trusted LAN. In an example, the first firewall may be configured to block incoming communications from one or more other devices on the trusted LAN from reaching the workspace and/or the sandboxed computing environment but may allow outgoing communications from the workspace and/or the sandboxed computing environment to one or more other devices on the trusted LAN.

The host computer system may include a second firewall. The second firewall may be implemented as a part of the sandbox container process. The second firewall may enforce a separation of the first and second memory spaces. The second firewall may segregate storage memory associated with the workspace and the sandboxed computing environment. The second firewall may allow a predefined set of processes to be executed within the sandboxed computing environment. The second firewall may prevent execution in the sandboxed computing environment of any processes outside of the predefined set of processes. The second firewall may prevent the second set of one or more applications and/or processes that operate within the sandboxed computing environment from accessing resources or processes in the first memory space. The second firewall may prevent the first set of one or more applications and/or processes that operate within the workspace from accessing resources and/or processes in the sandboxed computing environment. The second firewall may be configured such that the explicit user input allows one or more of a cut or copy of data, a paste of data, a printing of data to a local printer, or a file transfer to occur such that data is allowed to pass between the sandboxed computing environment and the workspace. Without such explicit user inputs, the second firewall may block or disallow transferring of data between the memory spaces.

The first memory space may be configured to store a known good version of the sandbox container process. One or more of the first set of one or more applications and/or processes may be allowed to restore the sandbox container process to the known good version. The workspace may include at least one host monitoring process configured to monitor the sandbox container process. The at least one host monitoring process may be configured to restore the sandbox container process to the known good version based on one or more of a user input, an application input, detection of an abnormality in the sandbox container process, or expiration of a predefined time. The host computer system may be configured to store a restore point of the sandboxed computing environment. The restore point may be associated with a configuration of the sandboxed computing environment. The host computer system may be configured to detect anomalous behavior within the sandboxed computing environment. The host computer system may be configured to restore, based on detection of the anomalous behavior, the sandboxed computing environment to the restore point.

The networked computer system may include a proxy/web-content server, for example, between the sandboxed computing environment and untrusted network resources. The sandbox container process may be configured to authenticate with the proxy/web-content server on behalf of the browser process, for example, using credentials stored in a configuration file of the sandbox container process. After authentication, the browser process may be allowed to access untrusted network resources via the proxy/web-content server. Each of a plurality of host computer systems comprised in the trusted LAN may access untrusted network resources via the proxy/web-content server and may result in a decrease in total traffic monitored on the trusted LAN.

DETAILED DESCRIPTION

Figure 1:
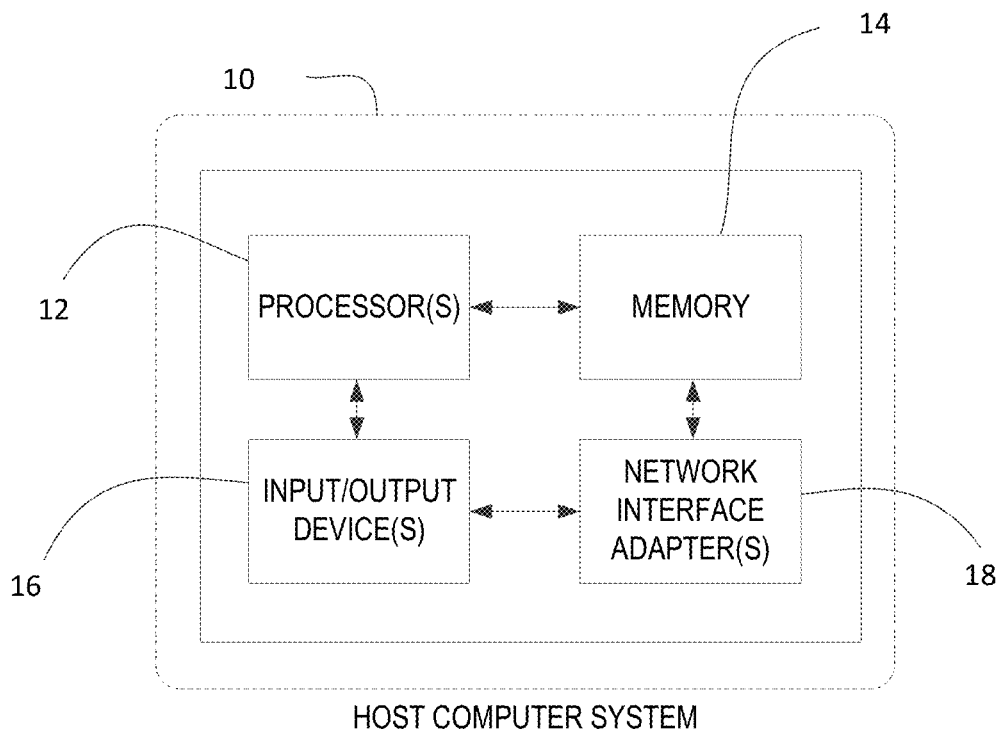
FIG. 1 depicts an example of a host computing system.

Systems and methods are disclosed for using sandbox based Internet isolation to limit and/or segregate security threats while connected to a trusted local area network (LAN). A host computer system may securely browse, access, and/or communicate with untrusted network destinations, including but not limited to resources accessible via the Internet. The host computer system may be connected to a trusted LAN and may have a sandbox protected application, such as a sandbox protected browser, and/or a firewall running thereon. For example, the sandbox protected application may operate within a sandboxed computing environment. The sandboxed computing environment may include resources (e.g., a limited set of resources) allocated to operation of a sandbox container process. The sandboxed computing environment may be enforced via the sandbox container process. The sandbox container process may be a security mechanism used to separate the sandboxed computing environment from other applications and/or processes that may be running on a workspace of the host computer system. The sandboxed container process may be configured to enable one or more applications and/or processes (e.g., such as a browser process) being executed within the sandboxed computing environment to access the resources allocated for operation of the sandbox container process. For example, the one or more applications and/or processes being operated within the sandboxed computing environment may be allowed to access memory associated with the sandboxed computing environment. The memory associated with the sandboxed computing environment may be separate from memory that is configured to enable storage and operation of the workspace.

The workspace may include one or more processes operating within the operating system that are not restricted by the sandbox container process. The operating system of the host computer system may include a set of resources configured to enable operation of the workspace and the sandbox container process.

The sandbox container process may have access to one or more operating system and/or kernel processes in order to enforce isolation between the workspace associated with the first memory space and the sandboxed computing environment associated with the second memory space. The sandbox container process may enforce the segregation using techniques such as namespace isolation such the that processes running on the sandboxed computing environment in the second memory space are restricted from accessing the first memory space including the workspace (e.g., and vice versa). The sandbox container process may restrict access to certain resources by processes running in the sandboxed computing environment. The sandboxed container process may allow the workspace and the sandboxed computing environment to share access to the host operating system and host operating resources (e.g., including the kernel and libraries) while enforcing the segregation of the memory spaces access by the workspace and the sandboxed computing environment. In this manner, the sandbox container process may permit isolation of the sandboxed computing environment without requiring the sandboxed computing environment to boot a separate operating system, load separate libraries, etc., which would require separate private memory for those files.

A browser process operating within the sandboxed computing environment may be permitted to access untrusted network destinations via an access connection device. For example, the browser process operating within the sandboxed computing environment may connect to the untrusted network destinations as a dedicated network interface device with using a specific Internet Protocol (IP) address. The browser process operating within the sandboxed computing environment may be referred to as a sandbox browser process. The host computer system may maintain a list of untrusted network destinations and/or a list of trusted network destinations. The list of trusted network destinations may be a whitelist. The list of untrusted network destinations may be a blacklist. The whitelist and the blacklist may be refined based on username and/or machine identification (ID). For example, the lists of trusted and untrusted network destinations may be different for different users and/or machines associated with the trusted LAN. The whitelist and/or the blacklist may be associated with one or more access levels. For example, a first whitelist and a first blacklist may be assigned to a first access level. An untrusted network destination may be an untrusted resource, an untrusted device, an untrusted website, and/or the like. Since the untrusted network destinations may be sources of malware, the browser process operating within the sandboxed computing environment may be allowed to communicate with the untrusted network destination(s), but other communication from the host computer system (e.g., communications originating from outside the sandboxed computing environment such as from within the workspace) to the untrusted network destination(s) may be prevented.

The host computer system may include a host-based firewall. The host-based firewall may be configured to prevent unauthorized communication between applications and/or processes operating in the workspace of the host computer system to other devices on the trusted LAN. The host-based firewall may be configured to block incoming communications to the workspace of the host computer system, except for predetermined trusted devices and/or predetermined network ports. The host-based firewall may allow outgoing communications to be sent from a process in the workspace to a trusted LAN destination.

The browser process operating within the sandboxed computing environment may run in a separated and/or isolated memory space from the workspace of the host computer system. For example, one or more applications and/or processes (e.g., such as the browser process) operating within the sandboxed computing environment may be segregated to a sandbox memory space that is separated and/or isolated from a memory space configured to enable storage and/or operation of the workspace on the host computer system. The applications and/or processes operating within the sandboxed computing environment may not access any additional resources of the host computer system without user action. For example, the sandbox container process and/or a sandbox firewall may generate a command prompt that enables a user selection if an application and/or process operating within the sandboxed computing environment is requesting access to resources outside of the sandbox memory space. By prompting the user to confirm that the applications and/or processes operating within the sandboxed computing environment are permitted to access additional resources outside the sandbox memory space, malware that is designed to attempt to remain transparent to the user may be limited to operation within the sandboxed computing environment. Thus, the malware within the sandboxed computing environment may be unable to access other resources available to the host system generally, such as local area networks and secure memory regions.

Certain actions may be allowed to be performed by the sandbox firewall with approval by the user of the host system. For example, an application and/or process operating within the sandboxed computing environment may be allowed access to the host system to perform one or more of a cut or copy of data, a paste of data, a printing of data to a local printer, a file transfer, and/or the like. The host computer system may prevent one or more other transfers of data between the sandboxed computing environment and the workspace except those user initiated actions described herein. For example, the sandbox container process may prevent unauthorized data transfers between the sandboxed computing environment and the workspace.

FIG. 1 illustrates an example of a host computer system that may implement one or more applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the sandboxed browser and/or other sandboxed applications(s) and/or process(es). The software may restrict sandbox-based access to one more file descriptors, memory, file system space, etc. For example, the applications and/or processes operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a sandbox container process. The sandbox container process may segregate the workspace associated with the first memory space from the sandboxed computing environment associated with the second memory space. For example, the sandbox container process may include a sandbox firewall. The sandbox firewall may enforce the segregation of the first and second memory spaces.

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 can allow user interaction with the Host Computer System 10, for example to allow certain interactions between an application or a process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The sandbox container process may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

As described herein, a sandbox protected browser may be used for communicating with untrusted sources, such as Internet based resources. In this manner, if malware is transferred back to the host computer system due to interactions with the untrusted source, the malware may be isolated to the sandboxed computing environment, which may make it difficult for the malware to infect the workspace of the host computer system. For example, the sandbox container process may prevent the malware toolset from performing a reconnaissance of the host computer system to assess what data is available from the host computer system, such as computing resources, files, network information, additional network connectivity, etc. The sandbox firewall may prevent the data on the host computer system from being reported back to the remote device that sent the malware to the host computer and/or any other remote devices.

The sandbox container process may prevent the malware toolset from determining user system privileges of the host computer system, which can be used to access data on any associated network or local area network. For example, applications and/or processes operating within the sandboxed computing environment may not have access and/or authorization to such host computer configurations.

The sandbox container process may prevent the malware toolset from accessing local files stored on the host computer system. For example, the sandbox container process may isolate the first memory space from the second memory space. Such isolation can help prevent the malware from attempting to transmit such information back to the remote device that is the source of the malware. For example, the malware toolset may attempt to transmit a local security database from which additional user credentials can be derived, including potential privileged user credentials. These user credentials may be used by the malware to attempt to gain access to other resources on any associated network or the local area network. Where the user credentials are for a privileged user account, these credentials may be used to gain privileged access to other resources on any associated network or local area network.

The sandbox container process may prevent the malware toolset from accessing a security token and/or hash of the host computer user from the memory of the host computer system and/or a network data stream. This security token or hash can be used to gain access to other resources on any associated network or the local area network. Where the security token or hash is for a privileged user account, this security token or hash may be used to gain privileged access to other resources on any associated network or local area network.

The sandbox container process may prevent the malware toolset from enabling remote control and/or access of the host computer system by a remote device that is unknown to the user. When malware enables remote control and/or access, the remote device may be able to control one or more (e.g., all) operations of an infected host computer system and perform whatever alternative uses that an enslaved, infected host computer system can perform. For example, a remote device may download additional data to an infected host computer system, access of other websites for denial of service attacks, and/or convert the infected host computer system into a source of malicious software from which toolsets or secondary payloads are downloaded to other, subsequently infected, host computer systems.

Use of a sandbox based computing environment to enforce internet isolation may offer several advantages as compared to other isolation techniques such as the use of virtual machines. For example, isolating a browser process or other applications and/or processes in a sandboxed computing environment rather than in a virtual machine may utilize less computing resources, which may improve the overall user experience. As an example, a virtual machine could be used to isolate a browser process; however, such an implementation would rely on access to a larger set of computing resources (e.g., more memory usage, more frequent processing usage, larger number of processes running overall, etc.) than a browser process operating in a sandboxed computing environment. The larger relative footprint of the virtual machine can draw resources away from other applications being implemented on the host computer system. By using a sandbox based isolation technique, fewer resources may be used by the browser, allowing for a more seamless user experience for other applications.

Use of a sandboxed computing environment to enforce internet isolation on a trusted host computer of a trusted LAN may reduce traffic from the trusted LAN to the Internet. For example, the traffic from the trusted host computer to untrusted resources may bypass the trusted LAN via the sandboxed computing environment and a proxy server. Therefore, the total traffic monitored on the trusted LAN may be reduced due to the implementation of the sandboxed computing environment to enforce internet isolation.

Figure 2:
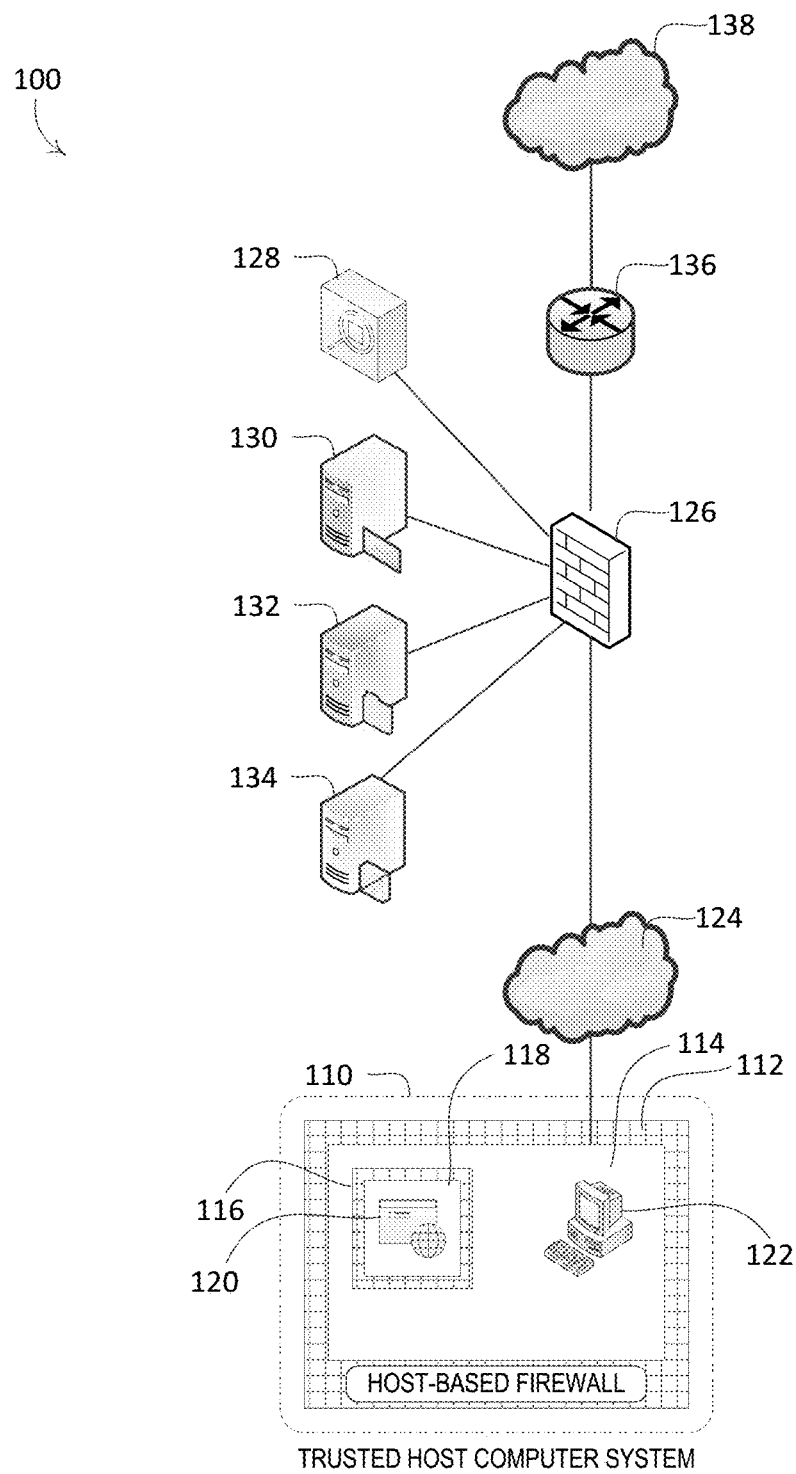
FIG. 2 depicts an example networked computer system having a host computer system using a sandbox based internet isolation system on a trusted local area network (LAN).

FIG. 2 depicts an example networked computer system 100 having a trusted host computer system 110 on a trusted local area network (LAN) 124. The trusted host computer system 110 may include an untrusted portion operating thereon. The trusted host computer system 110 may include a sandboxed computing environment 118 (e.g., an internet isolation system). The sandboxed computing environment 118 may be the untrusted portion operating on the trusted host computer system 110. The trusted LAN 124 may be connected to the Internet 138 via a border router 136 and a border firewall 126. A proxy/web-content filter 128 may be connected to the border firewall 126. The proxy/web-content filter 128 may, for example, in cooperation with the border firewall 126, control the type of data permitted to pass between the trusted LAN 124 and the Internet 138. For example, the proxy/web-content filter 128 may block data not intended for the trusted LAN 124 such as pornographic data, gambling data, and/or any data that has been pre-determined as inappropriate. The proxy/web-content filter 128 may enable the border firewall 126 to block communication between one or more devices on the trusted LAN 124 and sites on the Internet 138, such as pornographic sites, gambling sites, and/or any sites that have been pre-determined as inappropriate.

The border firewall 126 may be configured to block communication between one or more devices on the networked computer system 100 and the one or more untrusted network destinations. The border firewall 126 may have one or more exceptions. For example, one or more predetermined devices and/or applications may bypass the border firewall 126, for example, using a predetermined set of protocols. The one or more devices on the networked computer system 100 may include one or more electronic mail servers (e.g., such as the intermediary email device 130), one or more domain name service servers (not shown), the proxy/web-content filter 128, a secure file transfer server (e.g., such as the intermediary secure transfer device 132), a central monitoring security system 134, and/or any other service providing devices. Communication between the one or more devices and the Internet 138 may utilize one or more protocols required for the proper functioning of said devices.

The proxy/web-content filter 128 may be configured to analyze and/or validate communication between the networked computer system 100 and the Internet 138, e.g., a device on the Internet 138. Some communication, for example, between predetermined devices and/or via a predetermined set of protocols, may not be analyzed or validated by the proxy/web-content filter 128. The proxy/web-content filter 128 may determine that communication between a device on the networked computer system 100 and the Internet 138 is allowed. If the proxy/web-content filter 128 determines communication between the device and the Internet 138 is allowed, it may act as an intermediary communication point between the device on the networked computer system 100 and the device on the Internet 138. If the proxy/web-content filter 128 determines communication between the device and the Internet 138 is not permitted, it may terminate the communication (e.g., communication session).

The networked computer system 100 may be configured to utilize a Web Cache Control Protocol. The network computer system 100 may redirect web related traffic that is destined for the Internet 138 to the proxy/web-content filter 128, for example, using the Web Cache Control Protocol. The Web Cache Control Protocol may route the web-related traffic to the proxy/web-content filter 128 via a predetermined network port, for example, network port 1111. The proxy/web-content filter 128 may determine (e.g., uniquely distinguish) that traffic received from the networked computer system 100 is via the Web Cache Control Protocol, for example, based on the network port.

The trusted host computer system 110 may include a host-based firewall 112, an operating system 122, the sandboxed computing environment 118, a sandbox firewall 116, and a workspace 114. The trusted host computer system 110 may be any host computer system, such as a personal computer (PC), a laptop, a virtual machine, and/or any of a variety of other host computer systems operatively connected with one or more user-accessible data entry devices, a display device viewable by a user, and a computer-accessible data storage. The trusted host computer system 110 may include an operating system 122 and one or more application programs that run on the operating system 122.

As an example, the trusted host computer system 110 may be a PC, with 4 GB RAM and 146 GB hard disk computer-accessible storage, a monitor, a keyboard, and a mouse. The operating system 122 may be Windows-based, Linux-Based, Macintosh-based, and/or the like. The computer-accessible storage may store data corresponding to the software (e.g., computer-readable instructions) stored on the trusted host computer system 110 for common operation. Software programs may include word processing programs, accounting programs, remote connectivity programs, and/or other types of applications.

The sandboxed computing environment 118 may include resources (e.g., a limited set of resources) allocated to operation of a sandbox container process. The sandboxed computing environment 118 may be enforced via the sandbox container process. The sandbox container process may be a security mechanism used to separate resources associated with the sandboxed computing environment 118 from other applications and/or processes that may be running on a workspace 114 of the trusted host computer system 110. The sandboxed container process may be configured to enable one or more applications and/or processes (e.g., such as a browser process) being executed within the sandboxed computing environment 118 to access the resources allocated for operation of the sandbox container process. For example, the one or more applications and/or processes being operated within the sandboxed computing environment 118 may be allowed to access memory associated with the sandboxed computing environment 118. The memory associated with the sandboxed computing environment 118 may be separate from memory that is configured to enable storage and operation of the workspace. 114.

The workspace 114 may include one or more processes operating within the operating system 122 that are not restricted by the sandbox container process. The operating system 122 of the host computer system may include a set of resources configured to enable operation of the workspace 114 and the sandbox container process.

The trusted host computer system 110 may enable the host-based firewall 112. The host-based firewall 112 may prohibit communication (e.g., direct communication) between the trusted host computer system 110 and other devices on the trusted LAN 124. The host-based firewall 112 may prohibit communication (e.g., direct communication) between the trusted host computer system 110 and other devices within the networked computer system 100. For example, the host-based firewall 112 may be configured to block incoming traffic to the trusted host computer system 110, except for traffic received via one or more predetermined devices and/or ports. One or more devices (e.g., predetermined devices) on the networked computer system 100 or the trusted LAN 124 may bypass the host-based firewall 112, for example, using a predetermined set of protocols and/or ports.

The host-based firewall 112 may be implemented using software and/or hardware. For example, the host-based firewall 112 may be implemented using software that is commercially available, for example, such as Symantec Endpoint Protection, MacAfee Host Based Security Systems, etc. The host-based firewall 112 may be implemented using software inherent in the operating system 122 of the trusted host computer system 110, for example the Windows operating system firewall. The host-based firewall 112 may be implemented using software for configuring and/or implementing restrictive ingress and/or egress policies on the trusted host computer system 110.

The trusted host computer system 110 may enable the sandboxed computing environment 118, for example, using the sandbox container process. The sandbox container process may run within the operating system 122 of the trusted host computer system 110. For example, the sandbox container process may be configured to run within a first memory space of the trusted host computer system 110. The first memory space may be configured to enable storage and operation of a workspace configured to execute a first set of one or more applications and/or processes running on the operating system 122 of the trusted host computer system 110. One or more process operating within the sandboxed computing environment 118 may be prohibited from communicating with other resources within the networked computer system 100. A browser process 120 (e.g., a sandboxed browser process) may run within the sandboxed computing environment 118. The sandboxed browser process 120 may be configured to enable access to untrusted network destinations.

Browser solutions running within the workspace 114 of the trusted host computer system 110 may be utilized for communication between the trusted host computer system 110 and trusted network destinations. For example, browser processes running within the workspace 114 of the trusted host computer system 110 may enable access to the trusted network destinations.

The sandboxed computing environment 118 and/or the sandbox container process may be implemented using software and/or hardware. For example, the sandboxed computing environment 118 and/or the sandbox container process may be implemented using software that is commercially available, for example, such as Invincea Endpoint Protection, Tanium Endpoint Platform, Bromium Advanced Endpoint Security, etc.

The sandboxed computing environment 118 may provide separate and/or isolated memory space from the workspace 114 of the trusted host computer system 110. For example, the sandboxed computing environment 118 may be enforced using a sandbox container process. The sandbox container process may segregate the workspace 114 from the sandboxed computing environment 118. The first memory space (e.g., the workspace memory) may enable storage and/or operation of the workspace 114. The operating system 122 may enable operation of the sandboxed computing environment 118. The second memory space may enable storage and/or operation of one or more applications and/or processes associated with the sandboxed computing environment 118. For example, the second memory space may be reserved for storage and/or operation of the applications and/or processes running within the sandboxed computing environment 118. The sandbox container process may isolate the first memory space and the second memory space. For example, the sandbox container process may enable the sandbox firewall 116. The sandbox firewall 116 may enforce a separation of the first and second memory spaces. For example, the sandbox firewall 116 may allow a predefined set of processes to be executed within the sandboxed computing environment 118. The sandbox firewall 116 may prevent execution, in the sandboxed computing environment 118, of any processes outside of the predefined set of processes. The second memory space may be referred to as a separate and/or isolated memory space. The sandbox container process may segregate to the second memory space, any additional processes and/or memory usage required for usage of untrusted network destination related content during an established communication session. Separation and/or isolation of computer resources may be referred to as a virtual air gapped solution. The first memory space and the second memory space may be separate physical memory locations. The first memory space and the second memory space may be collocated on a physical memory. The first memory space and the second memory space may be enforced via a software partition.

The second memory space and the processes therein, may have limited access to the resources, assets, and/or files of the remainder of the computer-accessible data storage or memory space of the trusted host computer system 110. Data transfers between the sandboxed computing environment 118 and the workspace 114 of the trusted host computer system 110 may be restricted to set transfer types. The set transfer types may be configured to minimize the possibility of malicious data migrating from the sandboxed computing environment 118 to the workspace 114 of the trusted host computer system 110. The sandboxed computing environment 118 may transfer (e.g., only transfer) data to or from the workspace 114 of the trusted host computer system 110 in response to a user input directing the data transfer. The user input may be an explicit user input such as checking a box and/or selecting a button on an information prompt. The set transfer types that require user input may include one or more manual operations. For example, the set transfer types may include cut or copy of data, paste of data, a printing of data to a local printer, or a file transfer.

The operating system 122 may access (e.g., only access) the second memory space associated with the sandboxed computing environment 118 as required for the proper operation of the sandboxed computing environment 118. The sandbox firewall 116 may be built-in with the sandboxed computing environment 118

The sandboxed computing environment 118, when activated, may enable communication (e.g., indirect communication) between the trusted host computer system 110 and an untrusted network destination via the proxy/web-content filter 128. The sandboxed computing environment 118 may be activated via a desktop shortcut and/or one or more predetermined applications on the operating system 122 of the trusted host computer system 110.

As an example, an application short cut located on the user's desktop space, the desktop toolbar, and/or the standard program Start screen may be activated, for example, by a user selection. The sandbox container process may detect when a browser program is selected for activation. When the browser program is activated, the sandbox container process may terminate one or more running browser program processes and/or may activate the sandboxed browser process 120 within the sandboxed computing environment 118, as described herein.

The sandboxed browser process 120, when activated by the sandbox container process, may initiate a communication session to the proxy/web-content filter 128. For example, the communication session may be initiated utilizing an encrypted protocol on a predetermined network port that is different from the network port utilized by the Web Cache Control Protocol. During the initiation of the communication session, the sandboxed computing environment 118 may validate the authenticity of a sandbox browser process request for the communication session. The sandboxed computing environment 118 may authenticate the sandboxed browser process 120 using an authentication mechanism with the proxy/web-content filter 128. If the sandboxed browser process request fails authentication, the communication session may be terminated, for example, by the proxy/web-content filter 128.

The sandbox container process may initiate a communication session with the proxy/web-content filter 128 using an authentication mechanism. For example, the authentication procedure may use a predetermined protocol and may communicate with the proxy/web-content filter 128 using a predetermined communication port. As an example, the sandbox container process may initiate the sandboxed browser process 120 and the communication session with the proxy/web-content filter 128 using an NT LAN Manager (NTLM) and the predetermined network port 2222. As another example, the sandbox container process may initiate the communication session with the proxy/web-content filter 128 using a Secure Socket Layer (SSL) and the predetermined network port 2222. As part of the communication session, the sandboxed computing environment 118 may send validation credentials to the proxy/web-content filter 128, for example, using a predetermined authentication mechanism. The predetermined authentication mechanism may be a username/password combination. The username/password combination may be encrypted, for example, with an asymmetric or a symmetric encryption key system. The proxy/web-content filter 128 may be the only device able to decrypt the username/password combination.

The sandbox container process may be configured to authenticate with the proxy/web-content filter 128. For example, the sandbox container process may authenticate with the proxy/web-content filter 128 on behalf of the sandboxed browser process 120. The sandbox container process may authenticate with the proxy/web-content filter 128 using credentials stored in a configuration file. The configuration file may be encrypted. For example, the sandbox container process may be configured to read only encrypted configuration files.

Upon successful creation of a communication session between the sandboxed computing environment 118 and the proxy/web-content filter 128, the proxy/web-content filter 128 may analyze and/or validate the request to communicate with the untrusted network destination. If the request to communicate with the untrusted network destination is permitted, the proxy/web-content filter 128 may act as an intermediary communication point between the sandboxed computing environment 118 and the untrusted network destination.

A user may initiate a browser process and may enter and/or select a network destination. The trusted host computer system 110 may initiate the browser process in the workspace 114 or the sandboxed computing environment 118. The trusted host computer system 110 may determine whether the network destination is trusted or untrusted. The trusted host computer system 110 may provide access to a trusted network destination via the browser process executed in the workspace 114. The trusted host computer system 110 may provide access to an untrusted network destination via the sandboxed browser process 120 executed in the sandboxed computing environment 118. For example, the sandbox container process may be configured to spawn an instance of the sandboxed browser process 120 in the sandboxed computing environment 118 to provide access to the untrusted network destination.

As an example, a sandbox container process may determine that a browser process operating in the workspace 114 is attempting to access an untrusted network destination. The sandbox container process may spawn an instance of the sandboxed browser process 120 in the sandboxed computing environment 118 to provide access to the untrusted network destination. As an example, the sandbox container process may determine that the browser process operating in the workspace 114 is attempting to access a trusted network destination. The sandbox container process may allow the browser process operating in the workspace 114 to access the trusted network destination.

As another example, the sandbox container process may determine that the sandboxed browser process 120 operating in the sandboxed computing environment 118 is attempting to access an untrusted network destination. The sandbox container process may allow the sandboxed browser process 120 operating in the sandboxed computing environment 118 to access the untrusted network destination. As another example, the sandbox container process may determine that the sandboxed browser process 120 operating in the sandboxed computing environment 118 is attempting to access a trusted network destination. The sandbox container process may spawn an instance of a browser process in the workspace 114 to provide access to the trusted network destination.

The sandboxed computing environment 118 may receive malware from an untrusted network device. For example, the sandboxed computing environment 118 may communicate with the untrusted network device on the Internet 138 via the proxy/web-content filter 128. The untrusted network device may send malware (e.g., malicious software) to the sandboxed computing environment 118. The malware may be executed within the sandboxed computing environment 118. The executed malware may start one or more processes, download one or more payloads, and/or execute the one or more payloads. The processes and/or payloads may be executed within the sandboxed computing environment 118, for example, instead of on the workspace 114 of the operating system 122. When the sandboxed computing environment 118 has received malware, the sandboxed computing environment 118 may be considered infected and/or may be considered untrusted.

Even when the sandboxed computing environment 118 is infected and/or untrusted, the use of the sandbox based isolation may allow the trusted host computer system 110 to be considered to be uninfected and trusted. The trusted host computer system 110 may be considered uninfected and trusted because the memory space of the sandboxed computing environment 118 (e.g., the second memory space) and the processes operating therein may be separated and isolated from the memory space for the workspace 114 (e.g., the first memory space) of the trusted host computer system 110. The introduced malware may not be able to access the resources, assets, and/or files of the operating system 122. For example, the sandbox firewall 116 may prevent the introduced malware from accessing the resources, assets, and/or files of the operating system 122. The trusted LAN 124 (e.g., to which the trusted host computer system 110 is connected) may be deemed to be uninfected and trusted, for example, because the trusted host computer system 110 is considered trusted and uninfected.

A sandboxed computing environment 118 that becomes infected and/or untrusted may encounter problems. The sandbox container process associated with the infected sandboxed computing environment may become inoperable, for example, due to the introduced malware. An infected sandbox container process may restore a pristine copy (e.g., a "clean slate") of the sandboxed computing environment 118 processes and/or its separated and isolated memory space. An infected sandboxed computing environment may be cleared (e.g., immediately) and reverted to its original, trusted condition. For example, one or more (e.g., all) aspects of the introduced malware may be removed from the sandboxed computing environment 118 without any harm to the operating system 122. The sandbox container process may initiate a "clean slate" periodically, e.g., once a day, once every 12 hours, once an hour, etc. The sandbox container process may initiate a "clean slate" on demand, e.g., based on an indication and/or input received from the user of the trusted host computer system 110. The "clean slate" may be initiated using a restore capability of the sandbox container process.

For example, the workspace 114 of the trusted host computer system 110 may include at least one host monitoring process. The at least on host monitoring process may be configured to monitor the sandboxed computing environment 118 and/or the sandbox container process. The at least one host monitoring process may be configured to restore the sandbox container process to a known good version. The at least one host monitoring process may be configured to restore the sandbox container process based on one or more of a user input, an application input, detection of an abnormality in the sandbox container process, or expiration of predetermined period of time (e.g., a timer-based refresh mechanism).

The trusted host computer system 110 may be configured to store a restore point of the sandboxed computing environment 118. The restore point may be associated with a configuration of the sandboxed computing environment 118. The trusted host computer system 110 (e.g., an application or process operating within the workspace 114) may detect anomalous behavior within the sandboxed computing environment 118. The trusted host computer system 110 may restore the sandboxed computing environment 118 to the restore point, for example, based on detection of the anomalous behavior.

If malware on an infected sandboxed computing environment is able to access the resources, assets, and/or files of the operating system 122, the trusted host computer system 110 may be considered infected and untrusted. For example, the malware may bypass the sandbox firewall 116 via explicit user input. In an example, the other computer systems connected to the trusted LAN 124 may also be utilizing similar security and isolation systems as is described with respect to the trusted host computer system 110. Even if one of the computers on the trusted LAN 124 if infected and transmits malware messages on the LAN 124, the host-based firewall 112 configured on the other devices connected to the trusted LAN 124 may prohibit the introduced malware from communicating with/being passed to any other device on the trusted LAN 124. For example, the host-based firewall 112 may be configured to block incoming traffic from the trusted LAN 124. For example, the host-based firewall 112 may allow the trusted host computer system(s) 110 to send outgoing messages on the trusted LAN 124 (e.g., in order to reach certain trusted network locations), but the host-based firewall 112 may be configured to block incoming communications from the other devices connected to the trusted LAN 124. Thus, when an untrusted host computer system is connected to the trusted LAN 124, the trusted LAN 124 may remain uninfected and trusted even when other devices on the trusted LAN 124 become infected.

Malware may be introduced to the operating system 122 from a source other than communication with the Internet 138. For example, malware may be introduced to the operating system 122 via an infected email, an infected USB memory stick, and/or another infected hardware device.

An infected and/or untrusted host computer system (e.g., regardless of the introduced malware's vector) may have no communication (e.g., direct communication) with the Internet 138. For example, the sandbox container process may be configured to prevent the processes and applications in the workspace 114 from being allowed to access untrusted resources (e.g., via the Internet 138), which may prevent malware introduced into the workspace 114 from communicating with its source or other devices. Further, the border firewall 126 may prevent the infected and/or untrusted host computer system from communicating with the Internet 138. For example, the border firewall 126 may be configured to block traffic to untrusted sources sent from the host computer system unless the traffic originates from the sandboxed computing environment 118 (e.g., and is routed through the web-proxy as described herein). Without a connection to (e.g., communication with) the Internet 138, the introduced malware may be prevented from performing many toolset functions from within the workspace 114 as described herein or any other function that an enslaved, infected and/or untrusted host computer system may perform. Without a connection to the Internet 138, the introduced malware may not be able to transfer any data from the infected and/or untrusted host computer system (e.g., the workspace 114) to the Internet 138.

Malware may attempt to circumvent implemented host-based security protections. For example, the introduced malware may attempt to tamper with processes that are critical to the functioning of the host-based security protections. The networked computer system 100 may monitor the host-based security protections for tampering (e.g., by way of secondary processes or security applications). The networked computer system 100 may determine that one or more host-based security protection related processes have been tampered with, are missing, have stopped, and/or have been otherwise altered. Host-based security protection related processes may include processes associated with the host-based firewall 112 and/or the sandboxed computing environment 118 running on the operating system 122. The networked computer system 100 may initiate unaltered versions of the tampered, missing, stopped, and/or otherwise altered host-based security protection related processes.

The networked computer system 100 may monitor for any exceptions to normal and trusted operations of the trusted host computer system 110. The networked computer system 100 may send an alert message to a central monitoring security system 134. The alert message may indicate that one or more security protection related processes were restarted (e.g., automatically restarted). The alert message may include such details as required for the proper detection and remediation of the introduced malware.

The networked computer system 100 may detect an introduced malware's blocked attempt(s) to communicate with the Internet 138. For example, the networked computer system 100 may detect one or more blocked toolset functions and/or exceptions described herein, or any other blocked functions that an enslaved, infected host computer system may perform. An alert message that indicates the detected blocked communication attempt(s) may be sent to the central monitoring security system 134. For example, the device on the networked computer system 100 that detects the blocked communication attempt(s) may send the alert message to the central monitoring security system 134.

The networked computer system 100 may detect blocked communication attempts and/or exceptions using one or more of an event log from the trusted host computer system 110, the border firewall 126, the proxy/web-content filter 128, another firewall device within the networked computer system 100, an intrusion detection monitoring device within the networked computer system 100, a user authentication server within the networked computer system 100, or the like.

When an infected and/or untrusted host computer system connected to the trusted LAN 124 is detected, the trusted LAN 124 may perform remediation. Remediation may include one or more of removal of the infected and/or untrusted host computer system from the trusted LAN 124, analysis of the infected and/or untrusted host computer system, removal of the introduced malware from the infected and/or untrusted host computer system, rebuilding of the infected and/or untrusted host computer system to a trusted configuration, and/or replacing the infected and/or untrusted host computer system with another trusted host computer system (e.g., such as the trusted host computer system 110).

The trusted host computer system 110 and/or the trusted LAN 124 may limit the adverse effects of a received malware. For example, the trusted host computer system 110 and/or the trusted LAN 124 may prevent the received malware from using its vector to communicate data from the trusted host computer system 110.

An author of the malware may not be aware of any level of efficacy of the introduced malware, its successful attack vector, and/or any data of an infected host computer system that may have been compromised or collected, for example, because the networked computer system 100 may prevent communication between an infected and/or untrusted host computer system and the Internet 138.

An electronic mail (email) may be exchanged between the trusted host computer system 110 and the Internet 138. For example, the networked computer system 100 may include an intermediary email device 130 (e.g., an email server, an email proxy, or the like). The email may be sent and/or received by the trusted host computer system 110 using an email application run on the operating system 122. Although the intermediary email device 130 is shown in FIG. 2 as being directly connected to the border firewall 126, the intermediary email device 130 may be located within the trusted LAN 124.

The exchange of email between the trusted host computer system 110 and the Internet 138 may be accomplished through a web browser application, for example, when the intermediary email device 130 is not included in the networked computer system 100. The exchange of email may be accomplished via the sandboxed computing environment 118.

The protection controls described herein (e.g., the host-based firewall 112 and/or the sandboxed computing environment 118) may protect the trusted host computer system 110 from malware as described herein.

One or more files may be exchanged between the trusted host computer system 110 and untrusted network destinations, for example devices on the Internet 138. The files may be exchanged using an intermediary secure transfer device 132 (e.g., a transfer server, a transfer appliance, and/or the like). The intermediary secure transfer device 132 may be located in the networked computer system 100, for example, connected to the border firewall 126. Although the intermediary secure transfer device 132 is shown in FIG. 2 as directly connected to the border Firewall 126, the intermediary secure transfer device 132 may be located within the trusted LAN 124.

The trusted host computer system 110 may exchange files to an untrusted network destination, for example a device on the Internet 138. The files may be transferred from the trusted host computer system 110 to the intermediary secure transfer device 132. A file transfer may be initiated from the trusted host computer system 110 and/or from the device on the Internet 138. The file transfer may utilize an encrypted protocol via a predetermined network port. Authenticity of the file transfer may be validated, for example, prior to any data transfer.

For example, files may be copied using Secure Socket Shell (SSH) or Secure Socket Shell File Transfer Protocol (SFTP) operating over the network port 22. Prior to any data transfer, a Two Factor Authentication (TFA) may be used to validate that the file transfer is authentic and/or not part of a malware toolset. Other encrypted protocol(s), network port(s), and/or authentication combination(s) may be employed for data transfers from the trusted host computer system 110 to the intermediary secure transfer device 132.

The files received from the trusted host computer system 110 may be transferred from the intermediary secure transfer device 132 to an untrusted network device, for example a device on the Internet 138. The file transfer may be initiated from the device on the Internet 138. The file transfer may utilize an encrypted protocol via a predetermined network port. Authenticity of the device on the Internet 138 may be validated, for example, prior to any data transfer.

For example, files may be copied using Secure Socket Shell (SSH) or Secure Socket Shell File Transfer Protocol (SFTP) operating over the network port 22. Prior to any data transfer, a Two Factor Authentication (TFA) may be used to validate the authenticity of the device on the Internet 138. Other encrypted protocol(s), network port(s), and/or authentication combination(s) may be employed for data transfers from the intermediary secure transfer device 132 to a device on the Internet 138.

One or more files may be exchanged from an untrusted network devices, for example a device on the Internet 138 to the trusted host computer system 110. For example, the files may be transferred from the device on the Internet 138 to the intermediary secure transfer device 132. The intermediary secure transfer device 132 may send the files to the trusted host computer system 110. The file transfer from the device on the internet 138 to the trusted host computer system 110 may use an encrypted protocol (e.g., the same encrypted protocol as that used when files are transferred from the trusted host computer system 110 to the device on the internet 138) via a predetermined network port. Authenticity of the file(s) and/or the device may be validated, for example, prior to any data transfer.

Figure 3:
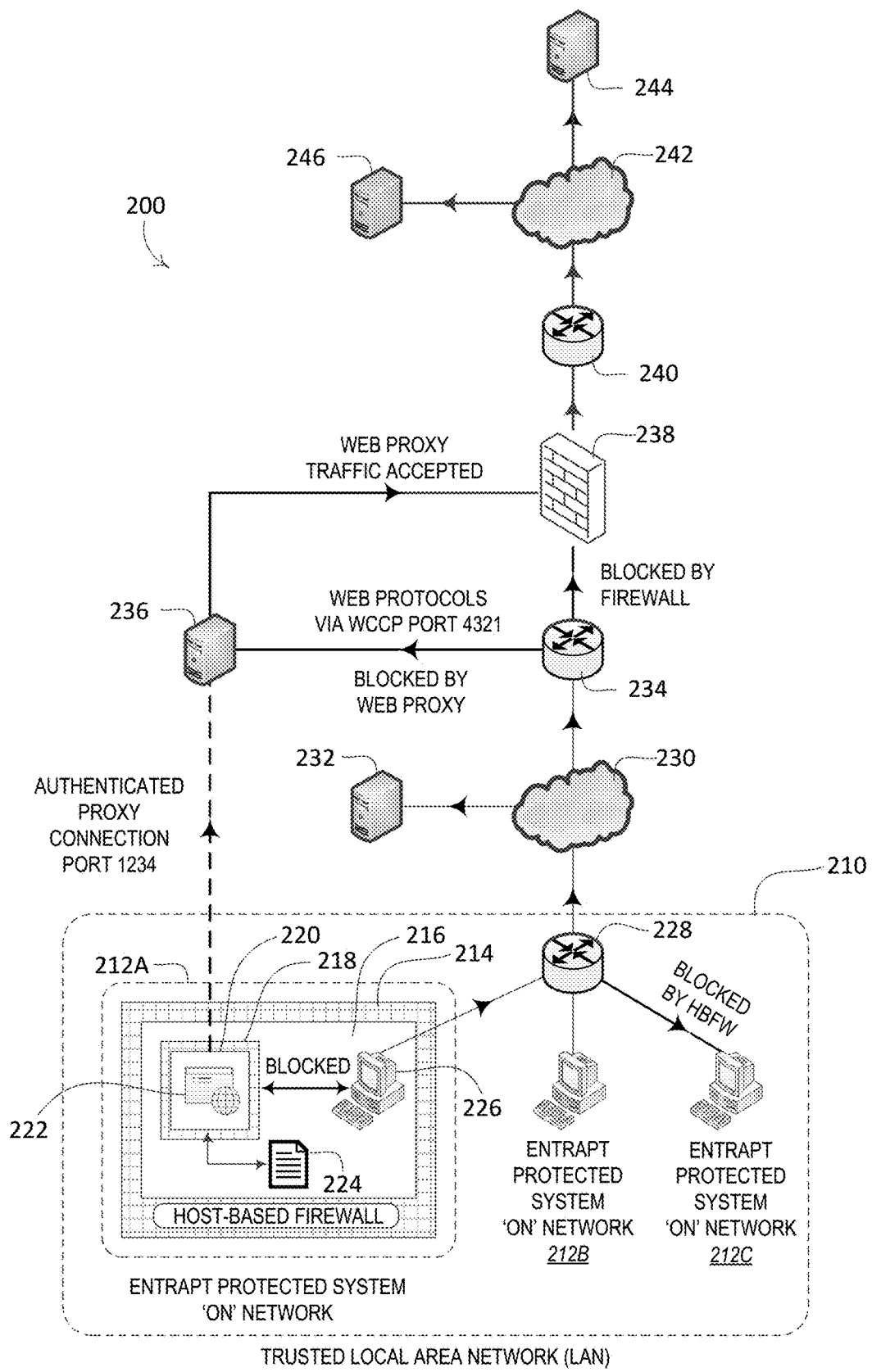
FIG. 3 depicts another example networked computer system having a plurality of host computer systems using a sandbox based internet isolation system on a trusted LAN.

FIG. 3 depicts another example networked computer system 200 having a plurality of trusted host computer systems 212A, 212B, 212C using a sandbox based internet isolation system on a trusted LAN 210. The trusted LAN 210 may include a LAN router 228. The LAN router 228 may be configured to service the plurality of trusted host computer systems 212A, 212B, 212C. The networked computer system 200 may include a trusted network 230, a trusted web server 232, an enterprise router 234, an enterprise firewall 238, a border router 240, and/or a web proxy 236. The trusted web server 232 may be provided via the trusted network 230. The trusted network 230 may connect the LAN router 228 to the enterprise router 234. The enterprise firewall 238 may be configured to restrict traffic to the untrusted network resources (e.g., the Internet 242) from the web proxy 236 and/or the enterprise router 234. The plurality of trusted host computer systems 212A, 212B, 212C may access a whitelisted web server 244 and/or an untrusted web server 246, for example, via the enterprise firewall 238 and/or the border router 240. The enterprise firewall 238 may be configured to block communication between one or more devices on the networked computer system 200 and one or more untrusted network destinations, for example the Internet 242. For example, the enterprise firewall 238 may be configured to block untrusted traffic that is not routed through the web proxy 236. The web proxy 236 may be configured to analyze and/or validate communication between one or more of the trusted host computer systems 212A, 212B, 212C and untrusted network destinations e.g., a device on the Internet 242. Some communication, for example, between predetermined devices and/or via a predetermined set of protocols, may not be analyzed or validated by the web proxy 236. The web proxy 236 may determine that communication between a device on the networked computer system 200 and the device on the Internet 242 is allowed. If the web proxy 236 determines that communication between the device and the device on the Internet 242 is allowed, the web proxy 236 may act as an intermediary communication point between the device on the networked computer system 200 and the device on the Internet 242. If the web proxy 236 determines that communication between the device and the device on the Internet 242 is not permitted, the web proxy 236 may terminate the communication (e.g., communication session).

The networked computer system 200 may be configured to utilize a Web Cache Control Protocol. The network computer system 200 may redirect web related traffic that is intended for an untrusted resource (e.g., such as the Internet 242) to the web proxy 236, for example, using the Web Cache Control Protocol. For example, the enterprise router 234 may receive traffic via web related traffic from the trusted network 230. The enterprise router 234 may redirect the web related traffic to the web proxy 236, for example. The Web Cache Control Protocol may route the web-related traffic to the web proxy 236 via a predetermined network port, for example, network port 4321 as shown. The web proxy 236 may determine (e.g., uniquely distinguish) that the traffic received from the networked computer system 200 is via the Web Cache Control Protocol, for example, based on the network port. The web proxy 236 may be configured to block one or more requests sent from one or more applications and/or processes operating within the workspace 216 of the trusted host computer system 212A, for example, based on the one or more requests being associated with the network port on which it is received, for example 4321. The web proxy 236 may be configured to allow the browser process 222 within the sandboxed computing environment 220 of the trusted host computer system 212A to access the untrusted destination based on the sandbox container process successfully authenticating with the web proxy 236 on behalf of the browser process 222. The sandbox container process may be configured to authenticate with the web proxy 236 using preconfigured credentials stored within an encrypted configuration file.

The trusted LAN 210 may include a plurality of trusted host computer systems 212A, 212B, 212C. Each of the trusted host computer systems may transmit electrical data signals to one or more other trusted host computer systems on the trusted LAN 210. Each of the trusted host computer systems may be identified by a unique local area network address.

A trusted host computer system 212A may include a host-based firewall 214, an operating system 226, a sandboxed computing environment 220, a sandbox firewall 218, and a workspace 216. The trusted host computer system 212A may be any host computer system, such as a personal computer (PC), a laptop, a virtual machine, and/or any of a variety of other host computer systems. The trusted host computer system 212A may be operatively connected with one or more user-accessible data entry devices, a display device viewable by a user, and/or a computer-accessible data storage. One or more application programs may run on the operating system 226.

As an example, the trusted host computer system 212A may be a PC, with 4 GB RAM and 146 GB hard disk computer-accessible storage, a monitor, a keyboard, and a mouse. The operating system 226 may be Windows-based, Linux-Based, Macintosh-based, and/or the like. The computer-accessible storage may store data corresponding to one or more software programs (e.g., computer-readable instructions) stored on the trusted host computer system 212A for common operation. The software programs may include word processing programs, accounting programs, remote connectivity programs, and/or other types of applications.

The sandboxed computing environment 220 may include resources (e.g., a limited set of resources) allocated to operation of a sandbox container process. The sandboxed computing environment 220 may be enforced via the sandbox container process. The sandbox container process may be a security mechanism used to separate resources associated with the sandboxed computing environment 220 from other applications and/or processes that may be running on a workspace 216 of the trusted host computer system 212A. The sandboxed container process may be configured to enable one or more applications and/or processes (e.g., such as browser process 222) being executed within the sandboxed computing environment 220 to access the resources allocated for operation of the sandbox container process. For example, the one or more applications and/or processes being operated within the sandboxed computing environment 220 may be allowed to access memory associated with the sandboxed computing environment 220. The memory associated with the sandboxed computing environment 220 may be separate from memory that is configured to enable storage and operation of the workspace. 216.

The workspace 216 may include one or more processes operating within the operating system 226 that are not restricted by the sandbox container process. The operating system 226 of the trusted host computer system 212A may include a set of resources configured to enable operation of the workspace 216 and the sandbox container process.

The trusted host computer system 212A may enable the host-based firewall 214. The host-based firewall 214 may prohibit and/or prevent communication (e.g., direct communication) between the trusted host computer system 212A and other devices on the trusted LAN 210. Each trusted host computer system on the trusted LAN 210 may include a host-based firewall (e.g., such as the host-based firewall 214). The host-based firewall 214 may prohibit and/or prevent communication (e.g., direct communication) between the trusted host computer system 212A and other devices within the networked computer system 200. For example, the host-based firewall 214 may be configured to block incoming traffic from the other devices within the networked computer system 200. The host-based firewall 214 may allow traffic received by the trusted host computer system 212A via one or more predetermined devices and/or ports. One or more devices (e.g., predetermined devices) on the networked computer system 200 or the trusted LAN 210 may bypass the host-based firewall 214, for example, using a predetermined set of protocols and/or ports.

The host-based firewall 214 may be implemented using software and/or hardware. For example, the host-based firewall 214 may be implemented using software that is commercially available, for example, such as Symantec Endpoint Protection, MacAfee Host Based Security Systems, etc. The host-based firewall 214 may be implemented using software inherent in the operating system 226 of the trusted host computer system 212A, for example the Windows operating system firewall. The host-based firewall 214 may be implemented using software for configuring and/or implementing restrictive ingress and/or egress policies on the trusted host computer system 212A.

The trusted host computer system 212A may run the sandboxed computing environment 220. The sandboxed computing environment 220 may run within the operating system 226 of the trusted host computer system 212A. For example, the sandboxed computing environment 220 may be configured to run within a first memory space of the trusted host computer system 212A. The first memory space may be configured to enable storage and operation of a workspace configured to execute a first set of one or more applications and/or processes running on the operating system 226 of the trusted host computer system 212A. For example, a browser process 222 may operate within the sandboxed computing environment 220. The sandboxed computing environment 220 may be prohibited from communicating with other devices within the networked computer system 200. The browser process 222 may be configured to enable access to untrusted network destinations.

Browser solutions running within the workspace 216 of the trusted host computer system 212A may be utilized for communication between the trusted host computer system 212A and trusted network destinations. For example, browser processes running within the workspace 216 of the trusted host computer system 212A may enable access to the trusted network destinations.

The sandboxed computing environment 220 and/or the sandbox container process may be implemented using software and/or hardware. For example, the sandboxed computing environment 220 and/or the sandbox container process may be implemented using software that is commercially available, for example, such as Invincea Endpoint Protection, Tanium Endpoint Platform, Bromium Advanced Endpoint Security, etc.

The sandboxed computing environment 220 may provide separate and/or isolated memory space from the workspace 216 of the trusted host computer system 212A. For example, the sandboxed computing environment 220 may be enforced using a sandbox container process. The sandbox container process may segregate the workspace 216 from the sandboxed computing environment 220. The first memory space (e.g., the workspace memory) may enable storage and/or operation of the workspace 216. The operating system 226 may enable operation of the sandboxed computing environment 220. The second memory space may enable storage and/or operation of one or more applications and/or processes associated with the sandboxed computing environment 220. For example, the second memory space may be reserved for storage and/or operation of the applications and/or processes running within the sandboxed computing environment 220. The sandbox container process may isolate the first memory space and the second memory space. For example, the sandbox container process may enable the sandbox firewall 218. The sandbox firewall 218 may enforce a separation of the first and second memory spaces. For example, the sandbox firewall 218 may allow a predefined set of processes to be executed within the sandboxed computing environment 220. The sandbox firewall 218 may prevent execution, in the sandboxed computing environment 220, of any processes outside of the predefined set of processes. The second memory space may be referred to as a separate and/or isolated memory space. The sandbox container process may segregate the second memory space, any additional processes and/or memory usage required for usage of untrusted network destination related content during an established communication session. Separation and/or isolation of computer resources may be referred to as a virtual air gapped solution. The first memory space and the second memory space may be separate physical memory locations. The first memory space and the second memory space may be collocated on a physical memory. The first memory space and the second memory space may be enforced via a software partition.

The separate and/or isolated memory space and the processes therein, may have limited access to the resources, assets, and/or files of the remainder of the computer-accessible data storage or memory space of the trusted host computer system 212A. Data transfers between the sandboxed computing environment 220 and the workspace 216 of the trusted host computer system 212A may be restricted to set transfer types. The set transfer types may be configured to minimize the possibility of malicious data migrating from the sandboxed computing environment 220 to the workspace 216 of the trusted host computer system 212A. The sandboxed computing environment 220 may transfer (e.g., only transfer) data to or from the workspace 216 of the trusted host computer system 212A in response to a user input directing the data transfer. The user input may be an explicit user input such as checking a box and/or selecting a button on an information prompt. The set transfer types that require user input may include manual operations. For example, the set transfer types may include cut or copy of data, paste of data, a printing of data to a local printer, or a file transfer.

The operating system 226 may access (e.g., only access) the separate and isolated memory space associated with the sandboxed computing environment 220 as required for the proper operation of the sandboxed computing environment 220. The sandbox firewall 218 may be built-in with the sandboxed computing environment 220.

The sandboxed computing environment 220, when activated, may enable communication (e.g., indirect communication) between the trusted host computer system 212A and an untrusted network destination (e.g., the Internet 242) via the web proxy 236. The sandboxed computing environment 220 may be activated via a desktop shortcut and/or one or more predetermined applications on the operating system 226 of the trusted host computer system 212A.

As an example, an application short cut located on the user's desktop space, the desktop toolbar, and/or the standard program Start screen may be activated, for example, by a user selection. The sandbox container process may detect when a browser process 222 is selected for activation. When the browser process 222 is activated, the sandbox container process may terminate one or more running browser program processes and may activate the browser process 222 within the sandboxed computing environment 220, as described herein.

The sandbox browser program process, when activated by the sandbox container process, may initiate a communication session to the web proxy 236. For example, the communication session may be initiated utilizing an encrypted protocol on a predetermined network port that is different from the network port utilized by the Web Cache Control Protocol. During the initiation of the communication session, the sandboxed computing environment 220 may validate the authenticity of a sandbox browser process request for the communication session. The sandboxed computing environment 220 may authenticate the sandbox browser process request using an authentication mechanism with the web proxy 236. If the sandbox browser process request fails authentication, the communication session may be terminated, for example, by the web proxy 236.

The sandbox container process may initiate a communication session with the web proxy 236 using an authentication mechanism. As an example, the sandbox container process may initiate the browser process 222 and the communication session with the web proxy 236 using a Secure Socket Layer (SSL) and the predetermined network port 1234. As another example, the sandbox container process may initiate the communication session using an NTLM and the predetermined network port 1234. As part of the communication session, the sandboxed computing environment 220 may send validation credentials to the web proxy 236, for example, using a predetermined authentication mechanism. The predetermined authentication mechanism may be a username/password combination. The username/password combination may be encrypted, for example, with an asymmetric or a symmetric encryption key system. The web proxy 236 may be the only device able to decrypt the username/password combination.

The sandbox container process may be configured to authenticate with the web proxy 236. For example, the sandbox container process may authenticate with the web proxy 236 on behalf of the browser process. The sandbox container process may authenticate with the web proxy 236 using credentials stored in a configuration file. The configuration file may be encrypted. For example, the sandbox container process may be configured to read only encrypted configuration files.

Upon successful creation of a communication session between the sandboxed computing environment 220 and the web proxy 236, the web proxy 236 may analyze and/or validate the request to communicate with an untrusted network destination. If the request to communicate with the untrusted network destination is permitted, the web proxy 236 may act as an intermediary communication point between the sandboxed computing environment 220 and the untrusted network destination.

A user may initiate a browser process and may enter and/or select a network destination. The trusted host computer system 212A may initiate the browser process in the workspace 216 or the sandboxed computing environment 220. The trusted host computer system 212A may determine whether the network destination is trusted or untrusted. The trusted host computer system 212A may provide access to a trusted network destination via the browser process executed in the workspace 216. The trusted host computer system 212A may provide access to an untrusted network destination via the browser process 222 executed in the sandboxed computing environment 220. For example, the sandbox container process may be configured to spawn an instance of the browser process 222 in the sandboxed computing environment 220 to provide access to the untrusted network destination.

As an example, a sandbox container process may determine that a browser process operating in the workspace 216 is attempting to access an untrusted network destination. The sandbox container process may spawn an instance of the browser process 222 in the sandboxed computing environment 220 to provide access to the untrusted network destination. The sandbox container process may determine that the browser process operating in the workspace 216 is attempting to access a trusted network destination. The sandbox container process may allow the browser process operating in the workspace 216 to access the trusted network destination.

As another example, the sandbox container process may determine that the browser process 222 operating in the sandboxed computing environment 220 is attempting to access an untrusted network destination. The sandbox container process may allow the browser process 222 operating in the sandboxed computing environment 220 to access the untrusted network destination. As another example, the sandbox container process may determine that the browser process 222 operating in the sandboxed computing environment 220 is attempting to access a trusted network destination. The sandbox container process may spawn an instance of a browser process in the workspace 216 to provide access to the trusted network destination.

The sandboxed computing environment 220 may receive malware from an untrusted network device. For example, the sandboxed computing environment 220 may communicate with the untrusted network device on the Internet 242 via the web proxy 236. The untrusted network device may send malware (e.g., malicious software) to the trusted host computer system 212A. The malware may be executed within the sandboxed computing environment 220 running on the trusted host computer system 212A. The executed malware may start one or more processes, download one or more payloads, and/or execute the one or more payloads. The processes and/or payloads may be executed within the sandboxed computing environment 220, for example, instead of on the workspace 216 of the operating system 226. When the sandboxed computing environment 220 has received malware, the sandboxed computing environment 220 may be considered infected and/or may be considered untrusted.

When the sandboxed computing environment 220 is infected and/or untrusted, the trusted host computer system 212A may be considered to be uninfected and trusted. The trusted host computer system 212A may be considered uninfected and trusted because the memory space of the sandboxed computing environment 220 and the processes operating therein may be separated and isolated from the memory space for the workspace 216 (e.g., the rest of the operating system 226) of the trusted host computer system 212A. The introduced malware may not be able to access the resources, assets, and/or files of the operating system 226. For example, the sandbox firewall 218 may prevent the introduced malware from accessing the resources, assets, and/or files of the operating system 226. The trusted LAN 210 (e.g., to which the trusted host computer system 212A is connected) may be deemed to be uninfected and trusted, for example, because the trusted host computer system 212A is considered trusted and uninfected.

A sandboxed computing environment 220 that is infected and/or untrusted may encounter problems. The sandbox container process associated with the infected sandboxed computing environment may become inoperable, for example, due to the introduced malware. An infected sandbox container process may restore a pristine copy (e.g., a "clean slate") of the sandbox browser processes and/or its separated and isolated memory space. An infected sandboxed computing environment may be cleared (e.g., immediately) and reverted to its original, trusted condition. For example, one or more (e.g., all) aspects of the introduced malware may be removed from the sandboxed computing environment 220 without any harm to the operating system 226. The sandbox container process may initiate a "clean slate" periodically, e.g., once a day, once every 12 hours, once an hour, etc. The sandbox container process may initiate a "clean slate" on demand, e.g., based on an input and/or indication received from the user of the trusted host computer system 212A. The "clean slate" may be initiated using a restore capability of the sandbox container process.

For example, the workspace 216 of the trusted host computer system 212A may include at least one host monitoring process. The at least on host monitoring process may be configured to monitor the sandboxed computing environment 220 and/or the sandbox container process. The at least one host monitoring process may be configured to restore the sandbox container process to a known good version. The at least one host monitoring process may be configured to restore the sandbox container process based on one or more of a user input, an application input, detection of an abnormality in the sandbox container process, or expiration of predetermined period of time.

The trusted host computer system 212A may be configured to store a restore point of the sandboxed computing environment 220. The restore point may be associated with a configuration of the sandboxed computing environment 220. The trusted host computer system 212A (e.g., an application or process operating within the workspace 216) may detect anomalous behavior within the sandboxed computing environment 220. The trusted host computer system 212A may restore the sandboxed computing environment 220 to the restore point, for example, based on detection of the anomalous behavior.

If malware on an infected sandboxed computing environment is able to access the resources, assets, and/or files of the operating system 226, the trusted host computer system 212A may be considered infected and untrusted. For example, the malware may bypass the sandbox firewall 218 via explicit user input. The host-based firewall 214 may prohibit the introduced malware from communicating with any other device on the trusted LAN 210. For example, the host-based firewall 214 may be configured to block incoming traffic from the trusted LAN 210. When an untrusted host computer system is connected to the trusted LAN 210, the trusted LAN 210 may remain uninfected and trusted.

Malware may be introduced to the operating system 226 from a source other than communication with the Internet 242. For example, malware may be introduced to the operating system 226 via an infected email, an infected USB memory stick, and/or another infected hardware device.

An infected and/or untrusted host computer system (e.g., regardless of the introduced malware's vector) may have no communication (e.g., direct communication) with the Internet 242. For example, the enterprise firewall 238 may prevent the infected and/or untrusted host computer system from communicating with the Internet 242. Without a connection to (e.g., communication with) the Internet 242, the introduced malware may be prevented from performing many toolset functions described herein or any other function that an enslaved, infected and/or untrusted host computer system may perform. Without a connection to the Internet 242, the introduced malware may not be able to transfer any data from the infected and/or untrusted host computer system to the Internet 242.

Malware may attempt to circumvent implemented host-based security protections. For example, the introduced malware may attempt to tamper with processes that are critical to the functioning of the host-based security protections. The networked computer system 200 may monitor the host-based security protections for tampering (e.g., by way of secondary processes or security applications). The networked computer system 200 may determine that one or more host-based security protection related processes have been tampered with, are missing, have stopped, and/or have been otherwise altered. Host-based security protection related processes may include processes associated with the host-based firewall 214 and/or the sandboxed computing environment 220 running on the operating system 226. The networked computer system 200 may initiate unaltered versions of the tampered, missing, stopped, and/or otherwise altered host-based security protection related processes.

The networked computer system 200 may monitor for any exceptions to normal and trusted operations of the trusted host computer systems 212A, 212B, 212C. The networked computer system 200 may send an alert message to one or more devices on the networked computer system 200. The alert message may indicate that one or more security protection related processes were restarted (e.g., automatically restarted). The alert message may include such details as required for the proper detection and remediation of the introduced malware.

The networked computer system 200 may detect an introduced malware's blocked attempt(s) to communicate with the Internet 242. For example, the networked computer system 200 may detect one or more blocked toolset functions and/or exceptions described herein, or any other blocked functions that an enslaved, infected host computer system may perform. An alert message that indicates the detected blocked communication attempt(s) may be sent to one or more devices on the networked computer system 200. For example, the device on the networked computer system 200 that detects the blocked communication attempt(s) may send the alert message.

The networked computer system 200 may detect blocked communication attempts and/or exceptions using one or more of an event log from one or more of the trusted host computer system 212A, 212B, 212C the enterprise Firewall 238, the web proxy 236, another firewall device within the networked computer system 200, an intrusion detection monitoring device within the networked computer system 200, a user authentication server within the networked computer system 200, or the like.

When an infected and/or untrusted host computer system connected to the trusted LAN 210 is detected, the trusted LAN 210 may perform remediation. Remediation may include one or more of removal of the infected and/or untrusted host computer system from the trusted LAN 210, analysis of the infected and/or untrusted host computer system, removal of the introduced malware from the infected and/or untrusted host computer system, rebuilding of the infected and/or untrusted host computer system to a trusted configuration, and/or replacing the infected and/or untrusted host computer system with another host computer system (e.g., such as the trusted host computer system 212A).

The trusted host computer system 212A and/or the trusted LAN 210 may limit the adverse effects associated with a received malware. For example, the trusted host computer system 212A and/or the trusted LAN 210 may prevent the received malware from using its vector to communicate data from the trusted host computer system 212A.

An author of the malware may not be aware of any level of efficacy of the introduced malware, its successful attack vector, and/or any data of an infected and/or untrusted host computer system that may have been compromised or collected, for example, because the networked computer system 200 may prevent communication between an infected and/or untrusted host computer system and the Internet 242.

An electronic mail (email) may be exchanged between the trusted host computer system 212A and the Internet 242. The exchange of email between the trusted host computer system 212A and the Internet 242 may be accomplished through a web browser application. The exchange of email may be accomplished via the sandboxed computing environment 220.

The protection controls described herein (e.g., the host-based firewall 214 and/or the sandboxed computing environment 220) may protect the trusted host computer system 212A from malware as described herein.

One or more files may be exchanged between the trusted host computer system 212A and untrusted network destinations, for example, devices on the Internet 242. The trusted host computer system 212A may exchange files to a device on the Internet 242. A file transfer may be initiated from the trusted host computer system 212A and/or from the device on the Internet 242. The file transfer may utilize an encrypted protocol via a predetermined network port. Authenticity of the file transfer may be validated, for example, prior to any data transfer.

For example, files may be copied using Secure Socket Shell (SSH) or Secure Socket Shell File Transfer Protocol (SFTP) operating over the network port 22. Prior to any data transfer, a Two Factor Authentication (TFA) may be used to validate that the file transfer is authentic and/or not part of a malware toolset. Other encrypted protocol(s), network port(s), and/or authentication combination(s) may be employed for data transfers from the trusted host computer system 212A. Authenticity of the device on the Internet 242 may be validated, for example, prior to any data transfer.

One or more files (e.g., such as file 224) may be downloaded via the browser process 222. The file(s) 224 may be transferred from the sandboxed computing environment 220 to the workspace 216. For example, the sandboxed computing environment 220 may enable user initiated file transfer to the workspace 216. The file(s) 224 may be transferred to the workspace 216 based on a received user selection. The file(s) 224 may have been exchanged from a device on the Internet 242 to the trusted host computer system 212A (e.g., the sandboxed computing environment 220). The file transfer from the device on the internet 242 to the trusted host computer system 212A may use an encrypted protocol (e.g., the same encrypted protocol as that used when files are transferred from the trusted host computer system 212A to the device on the internet 242) via a predetermined network port. Authenticity of the file(s) and/or the device may be validated, for example, prior to any data transfer.

The trusted host computer system 212A may be configured to enable cutting and/or copying text displayed in the sandboxed computing environment 220 and pasting the cut and/or copied text within a program running in the workspace 216. The trusted host computer system 212A may be configured to enable printing from the sandboxed computing environment 220 to a local printer (not shown).

Figure 4:
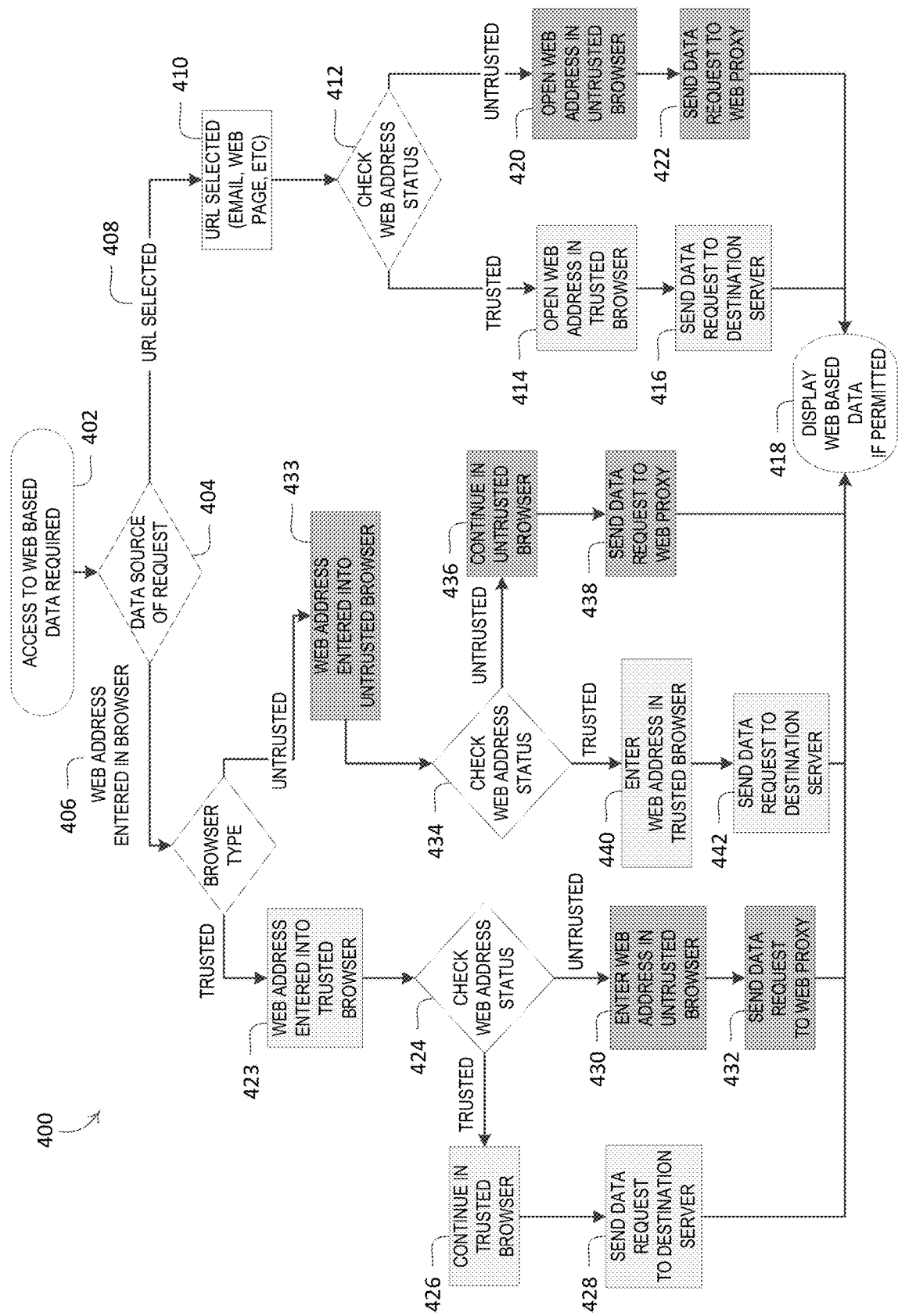
FIG. 4 depicts an example browser process switching based on the network destination.

FIG. 4 depicts an example browser process switching 400 based on the network destination. The example browser process switching 400 may be implemented by a trusted host computer system, for example, a sandbox container process operating on the trusted host computer system. At 402, a trusted host computer system may determine that access to web based data is required. At 404, the trusted host computer system may determine whether the data source of the request is a web address entered in a browser 406 or a URL selection 408. At 410, the trusted host computer system may determine that a URL has been selected, for example, via an email, a web page, and/or the like. At 412, the trusted host computer system may determine whether the network destination (e.g., web address) is a trusted or untrusted network destination. If the network destination is trusted, the trusted host computer system may open, at 414, the web address in a trusted browser running in the workspace of the trusted host computer system. For example, the trusted host computer system may spawn a trusted browser process in the workspace of the trusted host computer system to open the web address. The web address may be opened in a new tab of the browser program. The new tab may be associated with the trusted browser process. At 416, the trusted browser process may send a data request to a destination server. At 418, the browser process may display web based data (e.g., if permitted). If the network destination is untrusted, the trusted host computer system may open, at 420, the web address in an untrusted browser in a sandboxed computing environment of the trusted host computer system. For example, the trusted host computer system may spawn an untrusted browser process in the sandboxed computing environment. At 422, the untrusted browser may send a data request to a web proxy.

The trusted host computer system may, at 423, determine that the data source of the request is a web address entered into a trusted browser. If the web address was entered into a trusted browser operating within the workspace, the trusted host computer system may, at 424, determine whether the web address is a trusted or untrusted network destination. If the web address is a trusted network destination, the trusted host computer system may continue, at 426, in the trusted browser. For example, the trusted browser may send, at 428, a data request to a destination server associated with the web address. If the web address is an untrusted network destination, the trusted host computer system may enter, at 430, the web address in an untrusted browser. For example, the trusted host computer system may spawn an untrusted browser process in a sandboxed computing environment for accessing the untrusted network destination. The web address may be opened in a new tab of the browser program. The new tab may be associated with the untrusted browser process. The untrusted browser process may send, at 432, a data request to a web proxy.

The trusted host computer system may, at 433, determine that the data source of the request is a web address entered into an untrusted browser. If the web address was entered into an untrusted browser operating within the sandboxed computing environment, the trusted host computer system may, at 434, determine whether the web address is a trusted or untrusted network destination. If the web address is an untrusted network destination, the trusted host computer system may continue, at 436, in the untrusted browser. For example, the untrusted browser may send, at 438, a data request to a web proxy. If the web address is a trusted network destination, the trusted host computer system may enter, at 440, the web address in a trusted browser. For example, the trusted host computer system may spawn a trusted browser process in the workspace. The web address may be opened in a new tab of the browser program. The new tab may be associated with the trusted browser process. The trusted browser may send, at 442, a data request to a destination server associated with the web address.

The networked computer systems 100, 200 described herein may be implemented using software, hardware, and/or any combination thereof.

The terms used herein should be seen to be terms of description rather than of limitation. It is understood that those of skill in the art with this disclosure may devise alternatives, modifications, or variations of the principles of the invention. It is intended that all such alternatives, modifications, or variations be considered as within the spirit and scope of this invention, as defined by the following claims.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions and/or functional modules described herein.

What is claimed:

1. A networked computer system comprising:
   a trusted local area network (LAN), and
   at least one host computer system configured to connect to the trusted local area network (LAN), wherein the host computer system comprises a processor and a memory configured to implement at least:
   a trusted operating system that comprises a set of resources configured to enable operation of a workspace and a sandboxed computing environment;
   a first memory space that is configured to enable storage and operation of the workspace configured to execute a first set of one or more applications and processes;
   a second memory space that is configured to enable storage and operation of a second set of one or more applications and processes associated with the sandboxed computing environment, and wherein the second set of one or more applications and processes comprises a browser process configured to operate within the sandboxed computing environment;
   a sandbox container process, as a part of the trusted operating system, that enforces the sandboxed computing environment, wherein the sandbox container process segregates the workspace associated with the first memory space from the sandboxed computing environment associated with the second memory space, wherein the sandbox container process is configured to prevent data from being communicated between the sandboxed computing environment and the workspace without an explicit user input; and
   a first firewall configured to operate between the workspace of the first memory space and the trusted LAN, wherein the first firewall is configured to prevent unauthorized communication between the first set of one or more applications and processes executing within the workspace and one or more other devices on the trusted LAN.

2. The networked computer system of claim 1, wherein the sandboxed computing environment is configured to classify a network destination as trusted or untrusted based on one or more of a whitelist comprising a list of trusted network destinations or a blacklist comprising a list of untrusted network destinations.

3. The networked computer system of claim 2, wherein the trusted network destinations are accessed via one or more of the first set of one or more applications and processes associated with the workspace, and the untrusted network destinations are accessed via one or more of the second set of one or more applications and processes associated with the sandboxed computing environment.

4. The networked computer system of claim 3, wherein at least one untrusted network destination is located on the Internet and is accessed via the browser process configured to operate within the sandboxed computing environment.

5. The networked computer system of claim 1, wherein the sandbox container process comprises a second firewall, and the second firewall enforces a separation of the first and second memory spaces by:
   segregating storage memory associated with the workspace and the sandboxed computing environment; and
   allowing a predefined set of processes to be executed with the sandboxed computing environment, wherein the second firewall prevents execution within the sandboxed computing environment of any processes outside of the predefined set of processes.

6. The networked computer system of claim 5, wherein the second firewall is configured such that the explicit user input allows one or more of a cut or copy of data, a paste of data, a printing of data to a local printer, or a file transfer to occur such that data is allowed to pass between the sandboxed computing environment and the workspace.

7. The networked computer system of claim 1, wherein the first memory space is configured to store a known good version of the sandbox container process, and one or more of the first set of one or more applications and processes are allowed to restore the sandbox container process to the known good version.

8. The networked computer system of claim 7, wherein the workspace comprises at least one host monitoring process configured to monitor the sandbox container process, wherein the at least one host monitoring process is configured to restore the sandbox container process to the known good version based on one or more of a user input, an application input, detection of an abnormality in the sandbox container process, or expiration of a predefined time.

9. The networked computer system of claim 1, wherein the host computer system is configured to:

store a restore point of the sandboxed computing environment, wherein the restore point is associated with a configuration of the sandboxed computing environment;

detect anomalous behavior within the sandboxed computing environment; and restore, based on detection of the anomalous behavior, the sandboxed computing environment to the restore point.

10. The networked computer system of claim 1, further comprising a proxy/web-content server, wherein the sandbox container process is configured to authenticate with the proxy/web-content server on behalf of the browser process using credentials stored in a configuration file of the sandbox container process, wherein after authentication the browser process is allowed to access untrusted resources via the proxy/web-content server, and wherein each of a plurality of host computer systems comprised in the trusted LAN access untrusted resources via the proxy/web-content server, resulting in a decrease in total traffic monitored on the trusted LAN.

11. The networked computer system of claim 1, wherein the sandbox container process allows the workspace and the sandboxed computing environment to share access to the trusted operating system and the set of resources while enforcing the segregation of the first and second memory spaces.

12. A networked computer system comprising:
a trusted local area network (LAN),
a proxy server,
an enterprise router,
an enterprise firewall, and
a plurality of host computer systems configured to connect to the LAN, wherein each of the plurality of host computer systems comprises a processor and memory configured to implement at least:
 a trusted operating system that comprises a set of resources configured to enable operation of a workspace and a sandboxed computing environment;
 a first memory space that is configured to enable storage and operation of the workspace configured to execute a first set of one or more applications and processes;
 a second memory space that is configured to enable storage and operation of a second set of one or more applications and processes associated with the sandboxed computing environment, and wherein the second set of one or more applications and processes comprise a browser process configured to operate within the sandboxed computing environment;
 a sandbox container process, as a part of the trusted operating system, that enforces the sandboxed computing environment wherein the sandbox container process segregates the workspace associated with the first memory space from the sandboxed computing environment associated with the second memory space, wherein the sandbox container process is configured to prevent data from being communicated between the sandboxed computing environment and the workspace without an explicit user input; and
 a first firewall configured to operate between the workspace of the first memory space and the trusted LAN, wherein the first firewall is configured to prevent unauthorized communication between the first set of one or more applications and processes executing within the workspace and one or more other devices on the trusted LAN.

13. The networked computer system of claim 12, wherein the enterprise router is configured to route untrusted traffic to the proxy server, and the proxy server is configured to block one or more requests sent from the first set of one or more applications and processes on the host computer system based on the one or more requests being associated with an untrusted destination.

14. The networked computer system of claim 13, wherein the proxy server is configured to allow the browser process within the sandboxed computing environment of a host computer system to access the untrusted destination based on the sandbox container process successfully authenticating with the proxy server on behalf of the browser process.

15. The networked computer system of claim 14, wherein the sandbox container process is configured to authenticate with the proxy server using preconfigured credentials stored in an encrypted configuration file.

16. The networked computer system of claim 12, wherein the first firewall is configured to block incoming traffic from the trusted LAN except for traffic associated with trusted destinations received on predefined ports.

17. The networked computer system of claim 12, wherein the enterprise firewall is configured to block untrusted traffic that is not routed through the proxy server.

18. A host computer system configured to connect to a trusted local area network (LAN), the host computer system comprising:
a processor and memory configured to:
 configure a trusted operating system that comprises a set of resources configured to enable operation of a workspace and a sandboxed computing environment;
 configure a first memory space that is configured to enable storage and operation of the workspace configured to execute a first set of one or more applications and processes, the first set of one or more applications and processes allowed to execute in the workspace comprising a first browser process;
 configure a second memory space that is configured to enable storage and operation a second set of one or more applications and processes associated with the sandboxed computing environment, and wherein the second set of one or more applications and processes allowed to execute in the sandboxed computing environment comprises a second browser process;
 configure a sandbox container process, as a part of the trusted operating system, that enforces the sandboxed computing environment, wherein the sandbox container process segregates the workspace associated with the first memory space from the sandboxed computing environment associated with the second memory space, wherein the sandbox container process is configured to prevent data from being communicated between the sandboxed computing environment and the workspace without an explicit user input;
 determine a first network destination for the host computer system that is configured to connect to the trusted LAN;
 determine whether the first network destination is trusted or untrusted;
 if the first network destination is determined to be trusted, provide access to the trusted network destination via the first browser process executed in the workspace; and
 if the first network destination is determined to be untrusted, provide access to the untrusted network destination via the second browser process executed in the sandboxed computing environment.

19. The host computer system of claim 18, wherein the sandbox container process is configured to:
   determine that the first browser process operating in the workspace is attempting to access an untrusted destination; and
   spawn an instance of the second browser process in the sandboxed computing environment in order to access the untrusted destination.

20. The host computer system of claim 18, wherein the sandbox container process is configured to:
   determine that the second browser process operating in the sandboxed computing environment is attempting to access a trusted destination; and
   spawn an instance of the first browser process in the workspace in order to access the trusted destination.

* * * * *